Figure 5:
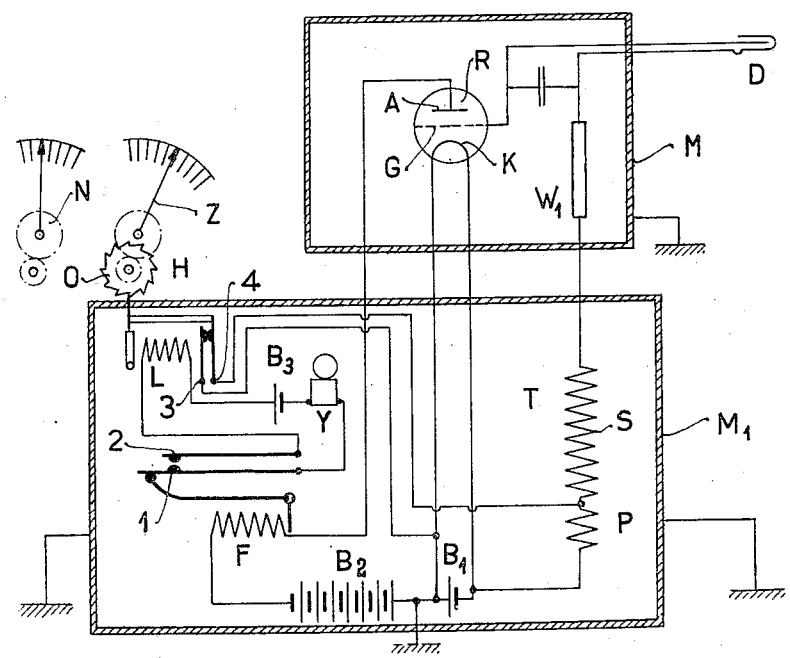

July 7, 1931.    S. STRAUSS    1,813,778
DEVICE FOR MEASURING HIGH RESISTANCES
Filed Oct. 14, 1926    2 Sheets-Sheet 1
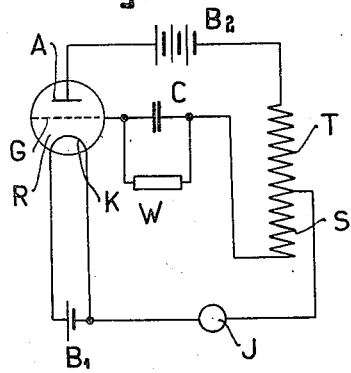
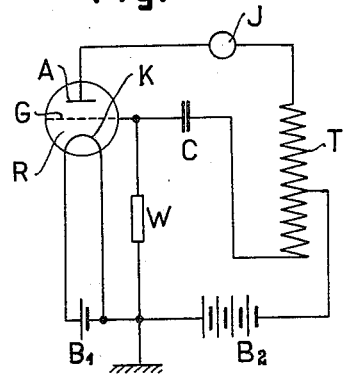
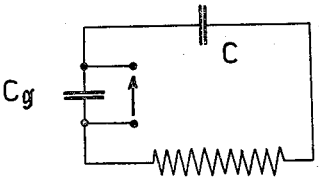
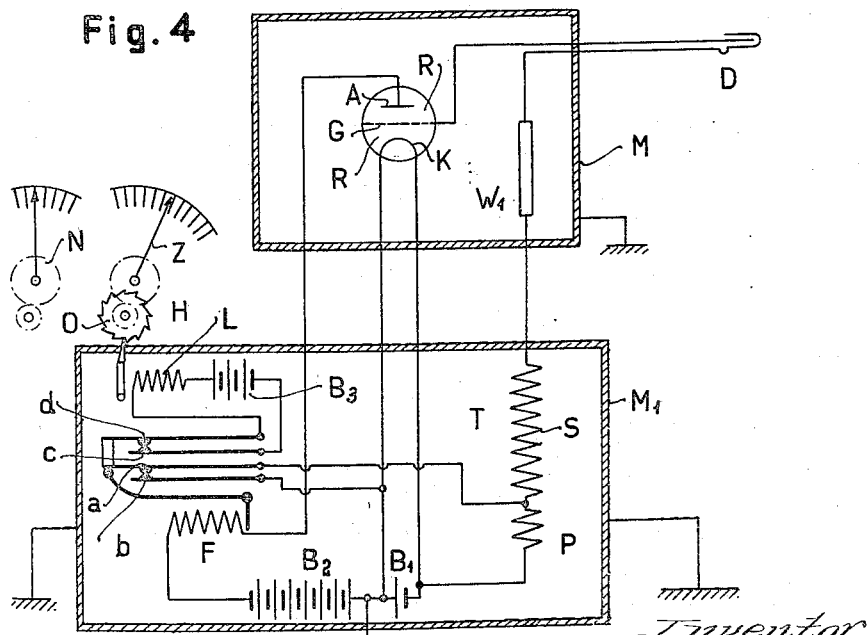
Inventor
Siegmund Strauss Patented July 7, 1931

1,813,778

UNITED STATES PATENT OFFICE

SIEGMUND STRAUSS, OF VIENNA, AUSTRIA

DEVICE FOR MEASURING HIGH RESISTANCES

Application filed October 14, 1926, Serial No. 141,622, and in Austria January 22, 1926.

This invention relates to instruments or apparatus for measuring high resistances, capacities or the intensity of Roentgen rays or the like, of the kind described in U. S. Patent No. 1,649,753 dated November 15, 1927. In this earlier patent an apparatus was described which consists of a thermionic valve with at least three electrodes, one of said electrodes controlling the flow of current in the vacuum. This electrode, commonly called the grid, receives a negative charge when the current is flowing through the valve which will throttle the current until it is entirely suppressed. If the negative charge of the grid is now discharged over the high resistance to be measured, the current in the valve will again begin to flow and the number of current impulses within the time unit or the interval of time between two current impulses due to the alternative negative charge and discharge of the grid is a very accurate indication for the value of the resistance to be measured.

An indicator connected with the valve circuit which indicates the disappearance and the return of the anode or valve current is therefore capable to indicate also the value of the resistance.

In an apparatus of the kind described, which forms the subject matter of my earlier application, certain difficulties are experienced, if the apparatus is used for registering or for optical indication of factors influencing the discharge resistance. The very high sensitivity of such an apparatus, the influence of disturbances and finally the fact, that no linear proportionality exists between the result obtained and the value to be measured require a special arrangement of the apparatus in question. Especially when Roentgen rays are to be measured various disturbances are due to the fact that the rays themselves or the means to obtain the high voltage necessary for their production are causing electric disturbances and impair the correct operation of the apparatus.

Now this invention consists in an arrangement which takes into account the very high sensitivity of the instrument and therefore eliminates all sources of disturbances especially the influence of external electric fields upon the instrument, or which allows to compensate for such influence and to establish exact and linear proportionality between the value of the influencing factor and the indication obtained by the measurement and which moreover allows a direct reading of the indications and the integration of the results, which is a particularly convenient form in connection with therapeutic work.

Exact and linear proportionality between the indications of the computing and measuring instrument and the value of the influencing factor is obtained according to this invention by providing a separate current path for the charge and for the discharge of the grid, and by the fact that the grid charge is produced forcibly by means of a negative charge impressed upon the grid in the given moment, so that the electron emission need not be relied upon to produce such a charge.

The capacity between the electrodes of the valve is moreover taken into account and means are provided whereby an influence of the capacity of the electrodes of the valve upon the result obtained is entirely prevented.

The discharge of the charge accumulating on the grid is not effected in the way described in my earlier application, but provision is made that the conductor leading to the resistance to be measured on the side which is opposite to the grid is connected directly with the cathode, whereby not only exact proportionality between the indication of the measuring apparatus and the value of the factor to be influenced is obtained, but also the necessity of using an apparatus with movable parts is dispensed with.

A further means employed by this invention to obtain full proportionality, to increase the sensitivity and to eliminate disturbances consists in freeing the conductor leading directly to the grid and the grid itself from all connections or apparatus and to provide as small a grid capacity as possible, which may be obtained by dispensing entirely with a separate grid condenser and by creating the necessary capacity only by suitable relative arrangement of the wires.

A further means for increasing the sensitivity and for eliminating disturbances consists in the entire separation of the grid circuit and the plate circuit, this being obtained by producing the current impulses necessary for providing the grid with a negative charge not in the plate circuit but within the grid circuit itself. Any disturbance due to external sources is eliminated by enclosing the grid together with all the conductors leading thereto completely in wire netting and it is preferred to enclose the whole apparatus within metal or netting made of metal.

To eliminate also the influence of external electric fields, which are especially always present in the case of the measurement of Roentgen rays the whole apparatus, especially the thermionic valve with all its conductors, is enclosed in metal tubes or hose made of wire netting, which are earthed at several places.

In special cases however disturbances though feeble may nevertheless occur. To eliminate the influence even of such feeble disturbances which find their way through the protective arrangement, a very high resistance, much higher than the resistance to be measured is arranged in series with the latter and moreover the plate voltage applied to the valve is increased, so that it is much higher than the plate voltage corresponding to the type of valve chosen. Such a high voltage which would be inadmissible under normal working conditions of the valve may however be admitted in this case as the periods within which any plate current is flowing at all are only very short.

These two means have the effect, that the influence of these small disturbances which penetrate into the apparatus are minimized so that they do not affect the result obtained by measurement to an appreciable amount.

The apparatus serves mainly the purpose of measuring the intensity of Roentgen rays for therapeutic or other purposes and it is capable to measure also the so-called Roentgen dose, that is the quantity of energy or power of the Roentgen rays administered for the time being. But it may also indicate or register the entire doses found by integration of the various doses applied during a certain time interval.

The invention is illustrated in the accompanying drawings which show diagrams of my former arrangement and of the arrangement described in this application by way of example.

Fig. 1 is a diagram of the arrangement described in my earlier application. Fig. 2 is a diagram serving to explain the operation of the arrangement forming the subject of this application. Fig. 3 is another diagram, showing one feature of this invention separately for the sake of better illustration. Fig. 4 illustrates the complete construction of an arrangement according to this invention. Fig. 5 shows another modification thereof.

The arrangement described in said beforementioned U. S. Letters Patent No. 1,649,753, as illustrated in Fig. 1, consists essentially of the thermionic valve R of the usual construction. The valve is provided with three or more electrodes K, G, A and its plate circuit contains the transformer T preferably of the autotransformer type, which is provided with the winding S leading to the grid circuit of the valve. A small grid condenser C is connected in the grid circuit and said condenser is bridged by the high resistance W to be measured.

The high tension or plate battery $B_2$ in this type of instrument is connected directly to the plate A of the valve and a small heating battery $B_1$ provides the necessary current for heating the cathode.

The operation of this former arrangement, as already explained, is based upon the fact that a negative charge suppresses entirely the plate current. The electrons emitted by the cathode cause a negative charge to accumulate upon the grid so that the current flow within the valve begins to cease when said negative charge has reached a certain value. The current impulse due to the beginning of the suppression of current causes by means of the transformer T a high negative tension to be applied to the grid thus completely stopping any flow of current. Now the negative charge of the grid may leak off through the resistance W to be measured and then the current flow through the tube will begin again. The period of time between cessation and renewal of the current flow is therefore dependent upon the value of W through which the discharge of the negative charge takes place. If therefore an indicator J, such as a telephone, is inserted in the anode circuit, ATK the number of impulses recorded by said instrument is an indication corresponding to a well defined value of W.

In this arrangement however some drawbacks have been experienced due to the very high accuracy and precision necessary for measuring by this method not only the value of a resistance but the minute variations of such a resistance due to an external factor, or, as is frequently the case, for measuring the varying value of the intensity of an external factor acting upon said varying resistance. These drawbacks consist mainly in wrong indications due to the extreme sensitivity of the instrument and to the presence of further disturbing external sources and in the fact, that there exists no direct and linear relation between the indication and the intensity of action of said factor.

A further drawback consists in the fact that the value of the resistance not only influences the discharge of the grid but also influences the charging of the same, as said charging partly at least is effected over said resistance. If the resistance is comparatively small the grid condenser only reaches a relatively small potential.

A further drawback lies in the influence of the inter-electrode capacity. This will be readily understood by referring to Fig. 2.

Assuming the cathode to be cold, the circuit has two capacities, the grid condenser C and the so-called interelectrode or grid capacity $C_g$ which is formed between the grid and the other electrodes closely surrounding the same. Both capacities are in series and are charged in common and equally discharged in common over the transformer. Whenever the cathode is heated the thermionic device acts like an electric valve i. e. the condenser $C_g$ is to be regarded as short circuited for a flow of curent in the direction shown by the arrow. When the grid condenser C is discharged (said discharge occurring in a direction opposite to that indicated by the arrow) the grid or interelectrode capacity $C_g$ acts like a condenser which is charged from the condenser C.

These various influences mentioned, affecting the operation and the proportionality between indication and value of influencing factor are obviated by the arrangement according to this invention, of which one feature is illustrated separately in Fig. 3. This feature consists in arranging the resistance to be measured not in parallel to the grid condenser but between the cathode and the grid of the valve. This arrangement has the advantage that charging of the grid is no longer effected over two parallel paths one of them containing the resistance, but only over one path, the resistance being entirely removed from the charging circuit and it has the further advantage that during discharge the grid condenser is connected in parallel with the grid or interelectrode capacity so that the discharge is not affected by the grid capacity. Full and exact proportionality between the discharge period and the value of the resistance is thus ensured.

A further advantage of this method consists in the fact that the highly perfect insulation of the terminal of the resistance remote from the grid is no longer necessary to ensure reliable operation. Such an insulation had to be almost perfect in the arrangement according to Fig. 1 to obtain a sufficient potential capable of suppressing the valve current. In the arrangement according to Fig. 3 no insulation of the terminal of the resistance W connected with the cathode is necessary. It may be connected to earth as indicated.

An arrangement embodying these and other features is illustrated in Figs. 4 and 5 of the drawings, which also diagrammatically shows how indicators capable of registering the numerical value of the results obtained may be worked by the same.

In Fig. 4 R indicates again the thermionic valve provided with a plate A, a grid G and a filament cathode K heated by a circuit supplied with current by a heater or "A" battery $B_1$. The filament resistance and other known appliances which are obvious to any one skilled in the art are omitted for the sake of simplicity of the diagram.

The grid G is connected to the resistance to be measured which in this arrangement, which mainly serves the purpose of measuring the intensity of Roentgen rays or the Roentgen dose, consists of a ionizing chamber D, a device which is already well known in the art for measuring the ionization and generally consists of a small, more or less evacuated bulb in which electrodes are sealed at a certain small distance; one of said electrodes may be formed by the walls of the bulb itself. Roentgen rays that fall upon said chamber D ionize the gap betwen the electrodes of the ionizing chamber. The resistance of the gaseous space between the electrodes of the ionizing chamber is thereby more or less varied in accordance with the intensity of the rays falling upon the chamber. To increase as far as possible the sensitivity which is necessary if resistances of such a high order have to be measured the entire capacity which is in connection with the grid should be as small as possible. As a certain small capacity, due to interelectrode capacity is always present, it is preferable to reduce the capacity of the grid circuit as far as possible and this reduction is effected according to this invention by dispensing entirely with a grid condenser even of the smallest type and to arrange only the wires leading to and from the ionizing chamber and the grid in such a way that a small capacity is formed by them. This is best done by providing wires running in substantial parallelism to each other for a certain distance, thus obtaining the necessary small additional capacity for the grid. This method has moreover further advantages, in that no special wires for the charge of the grid are necessary, a very important feature as every connection with the grid has not only to be specially insulated but is also the cause of various possible disturbances as this is the most sensitive part of the whole arrangement, which will be affected by the slightest influence.

The grid connections must be as short as conveniently possible. The second terminal of the ionizing chamber is connected with the secondary S of a transformer T, preferably of the auto transformer type, in which the said secondary is directly connected with the primary P. Said primary P is connected with the cathode circuit one of said connections being controlled by the contacts a, b of a relay F. The circuit of the primary P, when closed, forms a parallel connection to the heating circuit of the cathode K. However as the primary P has a much higher resistance than the filament of the cathode, this does not affect the operation of the valve.

The plate circuit of the valve includes the relay F and the high tension or "B" battery $B_2$ which is connected with the "A" battery $B_1$ as usual.

The relay F is provided in the example shown in Fig. 4 with two pairs of contacts a, b, c, d; as stated the contacts a, b are controlling the circuit containing the primary P of the transformer T, while the contacts c, d control another local circuit, containing the operating magnet or relay L of a computing or counting indicator H and a battery $B_3$ for energizing said magnet L.

The indicator mechanism H is shown diagrammatically only; it comprises a ratchet and pawl mechanism, advancing the ratchet wheel O one tooth at each actuation of the operating magnet L caused by the energization of the relay F and a gear actuating a pointer Z moving on a dial. This pointer indicates the number of energizations of the relay F and consequently the number of discharges of the grid over the resistance D. An electric or mechanic clockwork N may be arranged side by side with the counting mechanism to allow registration of the number of discharges within a given interval of time. Both apparatus may also be combined into one.

To reduce the influence even of very feeble disturbances of high resistance $W_1$, as indicated in Fig. 4 may be connected in series with the ionizing chamber D. Thus the discharge intervals are regular even in the case of disturbances.

To exclude practically any influence of external electric fields (always present in the event that any Roentgen or similar apparatus is arranged close by) all connecting wires leading to the grid must be as short as possible, so that the ionizing chamber D is arranged as close as possible to the valve R. Moreover all said connections and preferably the whole amplifier valve with all its connections are enclosed in metal tubes or hose M as completely as possible. It is moreover preferable to enclose also all the other apparatus including the relay F, the transformer T and the battery in a metal casing or in metal tubes or hose $M_1$. All these metal envelopes should not be made by special winding of wires but may preferably consist of metal netting or wire meshes. These protective envelopes may be earthed at several points or they may be connected with the earthed battery terminal.

As will be seen from the above description the grid connection is entirely free from all other connections and does not contain anything but the resistance formed by the ionizing chamber and the transformer windings. The plate circuit is entirely separated from the grid circuit, no connection being in common. Even the primary P of the transformer T is not connected with the plate circuit as in former cases but with a special circuit connected with the cathode. A special grid leak connection is completely dispensed with, and the number of elements and connecting wires is reduced to the absolute minimum, whereby highest precision in measuring and greatest freedom from disturbances is ensured. It is only by these means that the apparatus may be used as a reliable instrument for measuring the so-called Roentgen dose (that is the energy of power of the Roentgen rays in absolute units).

To eliminate or exclude irregularities even in presence of very strong stray fields the thermionic valve is worked with a plate voltage much higher than the voltage prescribed for the type of valve in actual use in the apparatus. This plate voltage is from 1½ to 2 and more times higher than the highest plate voltage admitted for the valve used. This high plate voltage, which would be entirely inadmissible in amplifier tubes for ordinary use may be safely used in this case as no continuous plate current is flowing but a plate current is only appearing during the short charging periods and for a very short time. The efficiency of the above means for counteracting the actions of stray fields is based upon the fact that these fields are liable to produce a high frequency voltage at the grid, which though very weak in itself may be sufficient to suppress the plate current in such a sensitive arrangement, just at the intervals, when it is wanted. The changing of the grid at the required intervals may therefore be disturbed. If however a higher plate voltage is chosen, the characteristic curve of the valve is shifted as is well known to the negative side and therefore even if the plate current is throttled by said high frequency potential, it will still be sufficient to alter charging of the grid.

In the modification of the arrangement shown in Fig. 5 the arrangement is practically the same, with the exception, that the relay F now only controls two contacts 1, 2 which shut or open the relay circuit operating the counting indicator H. The two contacts 3, 4 which control the circuit of the primary P are not operated directly from the relay F as before but indirectly by medium of the armature of the operating magnet L. They are closed in normal condition and are opened upon energization of the operating magnet L.

This arrangement has some advantages mainly consisting of the fact that the negative throttling charge can only be thrown upon the grid, if the relay F has operated correctly that is sufficiently to energize the operating magnet and the indicator. If this were not the case or if one of the batteries is exhausted, the contacts 3, 4 are not separated energetically and the negative charge will not be thrown upon the grid, so that a plate current will continue to flow and the operation ceases, the relay F and the magnet L remaining half energized. An annunciator Y may in this case be continuously sounding to indicate the irregularity. Moreover also in normal operation this arrangement has its advantages as the plate current must in all events increase up to a definite value, which is sufficient for operating the relay, before it is possible that suppression occurs by the negative charge thrown upon the grid through the transformer.

The operation of the apparatus described will be readily understood if reference is taken to my aforementioned earlier application. When the cathode is heated and a suitable voltage is applied to the plate A a current is flowing through the valve R and the plate circuit thereby energizing the relay F, which actuates the armature and opens the contacts $a, b$. As a current from the battery $B_1$ has been flowing through the circuit containing the primary P and said contacts this current is interrupted and an induction current is set up in the secondary S of such a direction that a high negative voltage is produced on that terminal of the secondary which is connected with the grid. The high negative charge thus impressed upon the grid suppresses the plate current completely and the flow of current through the thermionic valve ceases until the said negative charge of the grid has leaked off. This leakage passes the gaseous space in the ionizing chamber D and it is obvious that the intensity of the ionization in the said space dominates the interval during which the carrying off of the charge occurs. When the negative charge has leaked off the plate current is again beginning to flow over the relay F to the battery $B_2$.

Each energization of the relay F in addition to the interruption of the circuit of the primary energizes the operation magnet L, operates the ratchet wheel and advances the pointer Z for one unit. The pointer therefore shows the number of discharges within an interval of time indicated by the clockwork N.

The number of discharges registered by the pointer Z within a given interval is an exact measure for the value of the resistance in the chamber D and by virtue of the elimination of disturbing influences and owing to the means employed for ensuring exact and linear proportionality between the indication and the value of the resistance for the time being is also an exact measure for the so-called Roentgen does applied at a given moment or during a certain interval if the indications of H and N are compared.

The device is thus capable of registering immediately and by their numerical value all the data that are needed, such as in therapeutic Roentgen work.

Though the apparatus has been described especially in connection with Roentgen ray measurement which is one of the most difficult works, it is obvious that it may also be used for other purposes in which a high resistance, capacity or ionization, variable or not, is to be measured.

What I claim is:

1. An electrical measuring apparatus of the kind specified, comprising a thermionic valve with a plurality of electrodes, one electrode being a heated cathode and another an anode, both being included in an outer circuit, a further electrode being a grid controlling the flow of current through said thermionic valve, means dependent upon the flow of current in the outer circuit to impress a negative charge upon the grid capable of suppressing the flow of current through the thermionic valve, said means comprising a transformer having a primary and a secondary winding, a circuit for carrying away the negative charge to the grid, so as to restore the flow of current through the grid, said circuit containing the object to be measured and the secondary of the transformer, a further circuit connected with the heated cathode and containing the primary of the transformer, both circuits being connected, whereby a connection of the discharge circuit of the grid with the cathode is established.

2. An electrical measuring apparatus of the kind specified, comprising a thermionic valve, a heated cathode therein, and a circuit comprising a battery for heating said cathode, an anode and an anode circuit between said cathode and anode, a grid controlling the flow of current through the thermionic valve, means connected with said grid for impressing intermittently upon it a negative charge capable of suppressing the flow of current through the thermionic valve, said means including a transformer having a primary and a secondary, a circuit for carrying away the negative charge impressed upon the grid, said circuit including the object of which the resistance is to be measured and the secondary of said transformer and a circuit branched off in parallel from the heating circuit of the cathode and including the primary of said transformer and the heating battery.

3. An electrical measuring apparatus for measuring a resistance or the like, comprising a thermionic valve with a plurality of electrodes, one of said electrodes being a heated filament, another an anode, a valve circuit connected between them and a circuit for heating said filament, another electrode being a grid controlling the flow of current through the valve, means for providing said grid with a negative charge consisting of a transformer having a primary and a secondary winding, a circuit connected with said grid and with the cathode, said circuit containing the object to be measured and the secondary of the transformer, the primary of the transformer being inserted in a circuit arranged in parallel to the circuit of the heated filament, and means for breaking said circuit at intervals to generate current impulses in the primary of the transformer.

4. An electrical measuring apparatus according to claim 3, wherein said means for breaking said circuit at intervals is controlled by the flow of current through the thermionic valve and the outer circuit connected with the cathode and the anode.

5. An electrical measuring apparatus according to claim 3 with contacts in the circuit arranged in parallel to the circuit of the heated filament, and a relay controlling said contacts, the relay being energized by the flow of current through the thermionic valve.

6. An electrical measuring apparatus comprising a thermionic valve with a plurality of electrodes, one of said electrodes being a heated cathode and another an anode, an outer circuit connected with said electrodes, a further electrode being a grid controlling the flow of current within the thermionic valve, means for impressing a negative charge upon the grid sufficient to stop the flow of current through said thermionic valve, a relay controlled by the flow of current through the anode circuit and acting upon said means, so that a negative charge is impressed upon the grid whenever the relay is energized, and a leak path containing the object to be measured between said grid and cathode and capable of carrying off the negative charge of the grid within a definite period, depending upon the value of the electrical resistance of said object, thus restoring the flow of current through the anode circuit.

7. An electrical measuring apparatus according to claim 6, wherein the means to impress a negative charge to said grid consists of the secondary of a transformer connected with the grid and with the circuit of the heated filament.

8. An electrical measuring apparatus of the kind specified, comprising an electric circuit and means capable of maintaining a flow of current therein, a thermionic valve capable of controlling the flow of current through said circuit and including a heated cathode and an anode, both connected with said circuit, means for causing an interruption of the flow of current through said circuit comprising a grid electrode within said thermionic valve, means for impressing upon said grid electrode a charge that is negative with respect to said cathode, said means including an inductance coil and a relay in the anode circuit of the thermionic valve and operated by the current flowing through the circuit controlled by the valve, said relay opening and closing the circuit of said inductance to generate induction currents capable of producing said negative charge, means comprising a discharge circuit containing the object to be measured for discharging the negative charge impressed upon the grid, thus making the interval of time for said charge dependent upon the nature of the object to be measured, and means indicating the number of discharges of the grid.

9. In an electrical measuring apparatus of the kind specified, a thermionic valve comprising a heated cathode, an anode, and a grid electrode controlling the flow of current through said valve, means for impressing a negative charge on said grid electrode to interrupt the flow of current between said cathode and anode, said means comprising an inductance capable of generating an induction current, and a connection with said grid practicable for induction currents but impracticable for leakage currents, a measuring circuit to contain the object to be measured and connected with said grid and said cathode and adapted to allow discharge of the grid charge over the object to be measured, and restore the conductivity of the thermionic valve, and an annunciator circuit between said cathode and anode separate and distinct in all its elements from the measuring circuit and the charging circuit of the grid and containing the means for maintaining a flow of currents through said thermionic valve, means for controlling the generation of inductive charges to be applied to the grid and means annunciating the number of complete grid discharges.

In testimony whereof I affix my signature.

SIEGMUND STRAUSS.